May 30, 1950 K. KSIESKI 2,509,978
UNDERWING REFUELING SYSTEM
Filed April 7, 1949 3 Sheets-Sheet 1
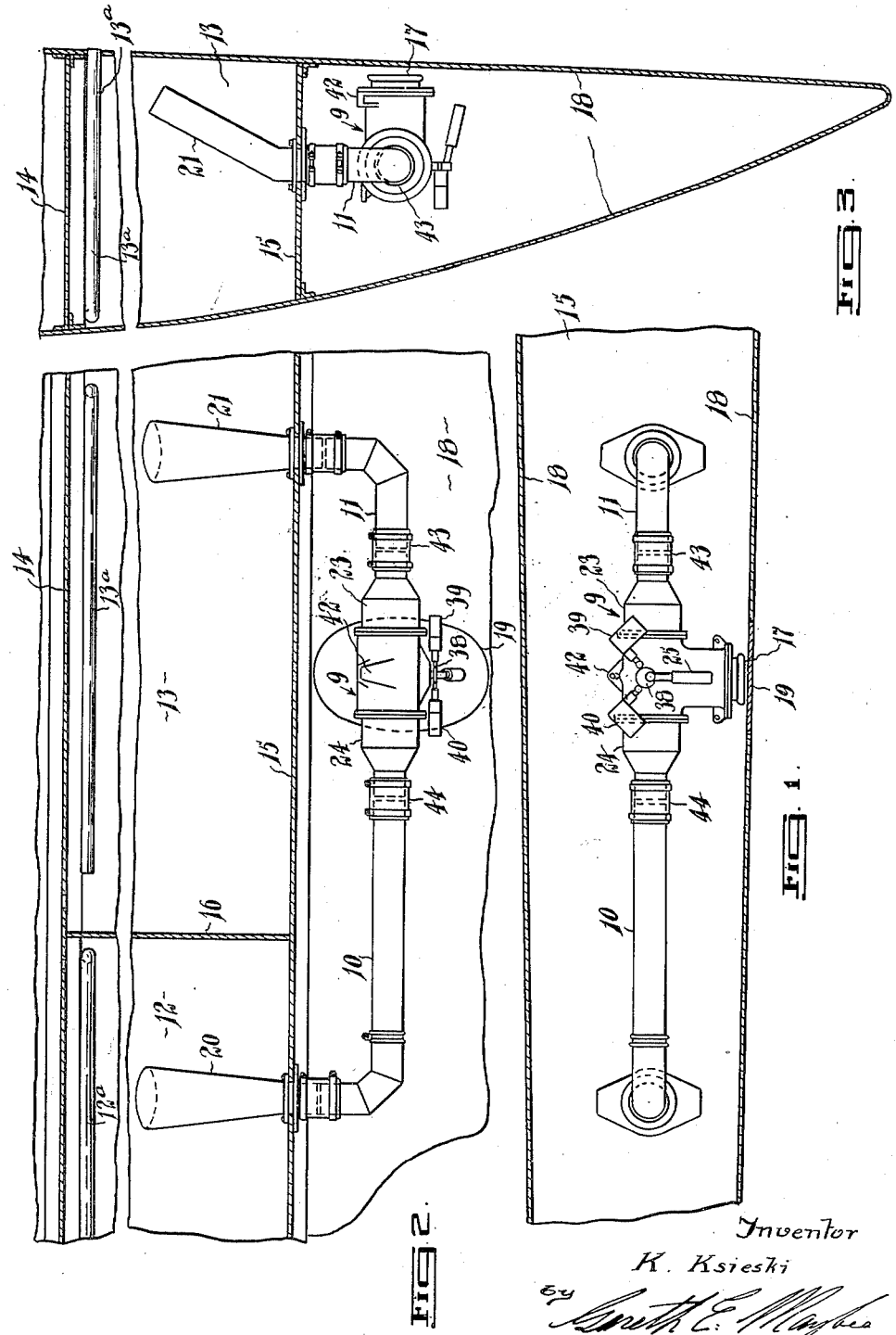
Inventor
K. Ksieski May 30, 1950 K. KSIESKI 2,509,978
UNDERWING REFUELING SYSTEM
Filed April 7, 1949 3 Sheets-Sheet 2
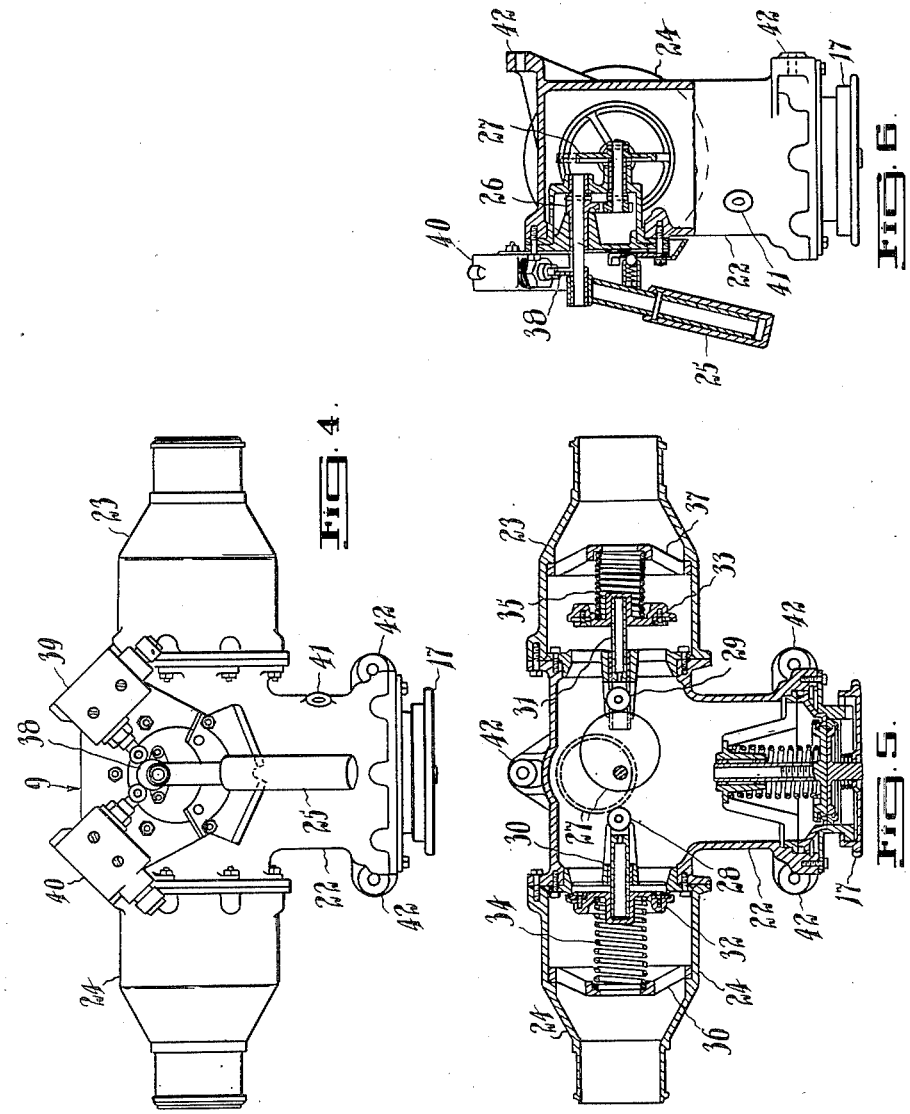
Inventor
K. Ksieski
by
ATTY.

May 30, 1950 K. KSIESKI 2,509,978
UNDERWING REFUELING SYSTEM
Filed April 7, 1949 3 Sheets-Sheet 3
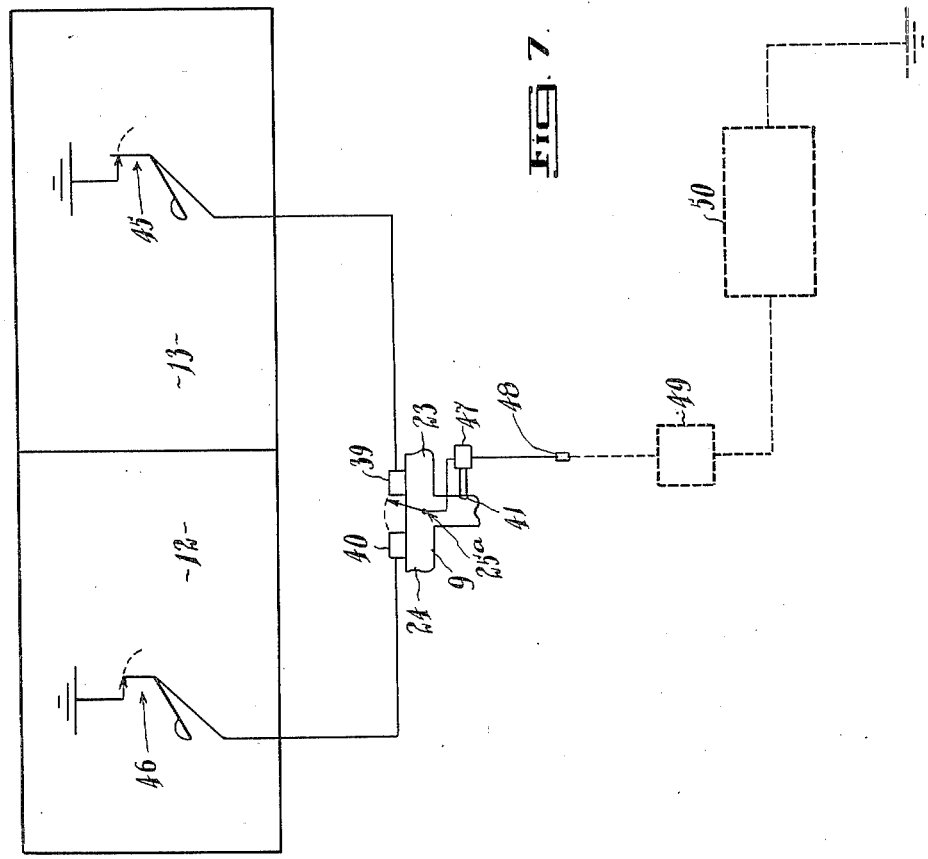
Inventor
K. Ksieski
by Gareth E. Maybee
ATTY.

Patented May 30, 1950

2,509,978

UNITED STATES PATENT OFFICE 2,509,978

UNDERWING REFUELING SYSTEM

Kazimierz Ksieski, Toronto, Ontario, Canada, assignor to A. V. Roe Canada Limited, Malton, Ontario, Canada, a corporation Application April 7, 1949, Serial No. 86,043

6 Claims. (Cl. 244—135)

This invention relates to improvements in refuelling systems for aircraft, particularly in systems in which refuelling is carried out under pressure.

Refuelling under pressure has been adopted primarily to increase the speed at which the refuelling of large aircraft can be carried out. Since the use of a pressure-tight refuelling connector makes it possible for the connector to be located anywhere on the aircraft, it may be located within easy reach of the ground, thereby eliminating the need for ladders and other gear to enable refuelling personnel to climb onto the top of the wings: thus the refuelling operation is not only more rapid but greatly simplified. Various methods have been adopted including the provision of individual connectors to each tank and the provision of manifolds or galleries feeding a number of tanks from a common connector. Whatever system is employed, the connectors are usually situated just inside access doors in the lower surface of the wing, and standardized connector sockets are used in order that aircraft may be readily serviceable by refuelling equipment situated at different aerodromes throughout the world.

The refuelling equipment comprises a hose connected to an electrically operated pump and it is a present statutory requirement in the United States of America that it should be capable of delivering fuel at 5 lb./sq. in. pressure at a rate of flow of some 200 U. S. gals. per minute. Tanks in the aircraft are equipped with vents but it is seldom possible or even desirable to provide vents of sufficient flow capacity to handle 200 U. S. gals. per minute at a safe pressure and, therefore, pressure refuelling systems invariably embody certain safety devices so that when a tank becomes full, no sudden build-up of pressure will occur which may cause the tank or any of the fuel lines associated therewith, to burst or spring seams and rivets. It will be realized that such damage might introduce a very serious fire hazard to the aircraft.

The object of this invention is to provide a refuelling system which is self-protecting against the risks of over-filling and is so arranged as to be light and readily accessible without seriously affecting the strength of the wing structure. Other objects and advantages of the invention will be apparent during the course of the following description.

In the accompanying drawings forming a part of this application and in which like reference characters designate like parts throughout the several views:

Fig. 1 is a fragmentary section through a wing aft of the rear spar showing an elevation of a typical system feeding two tanks through a manifold;

Fig. 2 is a horizontal section showing a plan view of the system in Fig. 1;

Fig. 3 is a vertical section showing an end elevation of the system shown in Fig. 1;

Fig. 4 is an external view on an enlarged scale of the selector unit shown in Fig. 1;

Fig. 5 is a longitudinal section of the unit shown in Fig. 4;

Fig. 6 is a partially sectioned side elevation of the unit shown in Fig. 4; and

Fig. 7 is a diagrammatic layout showing the electrical installation associated with the system.

It will be seen from Figs. 1, 2 and 3 that the system consists of a selector unit 9 and a manifold comprising two branches 10 and 11 which feed two tanks 12 and 13 respectively equipped with standard vents 12a and 13a. In this particular arrangement the tanks are not independent units but are integral with the structure of the wing and are bounded by the front spar 14 and the rear spar 15 of the wing, and by interspar baffles 16. The manifold system is situated behind the rear spar 15. The selector unit 9 embodies a standard refuelling connector 17 and this is accessible through the lower surface of the wing, aft of the rear spar 15, which is in a comparatively unstressed area so that heavy reinforcement to the skin 18 around the access door 19 is not required. Similarly no heavy reinforcement to the web of the rear spar 15 is required around the points where the manifold enters the individual tanks, since only small holes have to be cut in the web to accommodate the branches of the manifold in comparison to the holes which would be necessary to accommodate direct application of individual refuelling connectors.

In addition, Figs 2 and 3 illustrate how the fuel from the refuelling manifold is discharged into the tanks 12 and 13 through diffusors 20 and 21 respectively, to reduce the velocity of the fuel and so prevent swirl and vaporization.

Details of the selector unit itself are shown in Figs. 4, 5 and 6. It comprises a main body 22 and two valve casings 23 and 24 which are connected in the installation to the two branches 11 and 10 respectively, of the manifold. The standard refuelling connector 17 is also mounted on the body 22. The selector mechanism consists of a lever 25 which is connected through a greasepacked gear box 26 to an eccentric or cam 27, and this cam, acting upon rollers 28 and 29 on the valve stems 30 and 31, lifts the valves 32 and 33 from their seatings. Only one valve can be lifted at a time by this selector mechanism, and the gearing in the gear box 26 is such that both valves are in the closed position, resting on their seatings, when the handle 25 is central, while either may be lifted by a 45° movement of the handle in the appropriate direction. Thus from the opening of one valve to the opening of the other, the handle must be moved through 90°: this is a convenient travel for the operation of the selector unit through the small access door 19 in the lower surface of the wing.

The valves are retained on their seatings, in the closed position, by the springs 34 and 35 which are supported on spiders 36 and 37 mounted inside the valve casings 24 and 23.

The spindle of the handle 25 also carries a cam 38 which is provided to actuate, according to the tank selected, the microswitches 39 and 40, mounted on the outside of the body 22. The function of these microswitches will be explained later.

In addition, a pressure-sensitive switch is installed on the body of the selector unit, on the boss 41. This switch is not shown in Figs. 4, 5 or 6 since its form and detail are not essential to this invention, but it is shown diagrammatically in Fig. 7 and its function will be described later in an explanation of the electrical installation.

The selector unit 11 is mounted on a suitable bracket (omitted from the drawings for the sake of clarity) on the rear spar by bolts through the three lugs 42 on its body, and it is connected by means of flexible joints 43 and 44 to the branches 11 and 10 of the manifold. These particular branches are made of light alloy tubing and installed in accordance with normal aircraft engineering practice.

The type of refuelling equipment at present preferred embodies an electronic control which, in effect, allows the pump to run only when a complete electrical circuit exists through the pump and its connections to the aircraft, and through the aircraft structure to ground; the refuelling pump being also grounded. If this circuit is broken, the flow of fuel is immediately stopped thus eliminating, amongst other things, the risk of fire due to static discharge. Aircraft installations intended for use with this refuelling equipment embody a series of safety switches to break this electrical circuit when a tank is full and these include float-operated switches, (sometimes called float switches) which break the circuit when a predetermined fuel level has been reached, and pressure-sensitive switches which break the circuit if the pressure in the system becomes excessive. The switches are usually arranged in series and the pressure-sensitive switch is in fact intended to serve only as a precautionary measure against failure of the float-operated switch. In this invention, these standard electrical devices have been incorporated and they are shown in the wiring diagram set out in Fig. 7. The fuel level in the tank 13 is controlled by the float-operated switch 45 and a similar switch 46 is mounted in the tank 12. One side of each of these switches is grounded to the structure of the aircraft and the other side is connected to one or other of the aforementioned microswitches mounted on the selector unit 9: the float switch 45 is connected to the microswitch 39 and the float switch 46 to the microswitch 40. The pressure-sensitive switch 47 is mounted on the boss 41 in the body of the selector unit and is wired on the one hand to the microswitches, and on the other to an electrical socket 48, which is mounted on the outside of the aircraft in a position readily accessible to anyone attaching the external refuelling hose to the connector 17. In Fig. 7, the arrow 25a indicates diagrammatically the manner in which the circuit is completed from one of the float-operated switches through the selected microswitch and the pressure-sensitive switch 47, in series, to this external socket 48.

The part of the electrical system which is shown in dotted lines on Fig. 7 is related to the ground equipment and is not a part of this refuelling installation in the aircraft. However, it is shown in order to complete the wiring diagram, and to illustrate the principle involved. The block 49 represents an electronic control which is a standard part of this ground equipment and the motor of the refuelling pump is designated by the numeral 50. The circuit is completed from the junction at 48 through this electronic control 49 and the motor 50 to ground.

The refuelling operation is started by connecting the hose from the ground equipment to the connector 17 on the aircraft and making the electrical circuit from the ground equipment to the aircraft by inserting the plug on the ground equipment into the socket 48. At this stage, the selector handle 25 is central and the electrical circuit is broken at the microswitches 39 and 40 because neither microswitch is selected. The refuelling pump motor, therefore, cannot run. When the handle is turned in an anti-clockwise direction, that is, towards tank 13, the circuit is made through the microswitch 39 and the refuelling pump is set in motion. At the same time, the cam 27 lifts the valve 33 off its seating so that fuel entering the connector 17 flows through the valve casing 23 and branch 11 of the manifold into the tank 13. The valve 32 remains closed, held in position by the spring 34, and no fuel passes up the branch 10 into the tank 12. As stated in the preamble to this specification, the rate of delivery into the tank 13 is some 200 U. S. gals. per minute. The pressure in the body of the selector valve 9 is dependent upon the hydrostatic head of fuel in the tank 13 and the pressure drop in the branch 11 of the manifold system: this value is, of course, materially below the maximum pressure of 5 lbs./sq. in. which must be available for refuelling. Since the tank is vented, the air in the tank is expelled as the fuel enters, and the tank vent 13a is adequate to insure that there is no build-up of pressure on this account.

When the fuel in the tank 13 reaches a predetermined level, the float-operated switch 45 will open the electrical circuit and bring the refuelling pump 50 to rest. The act of centralizing the handle 25 will complete the refuelling operation for this tank.

However, it will be understood that if the float-operated switch 45 were to stick or otherwise fail to function, the pump 50 would continue to run and fuel would continue to enter the tank 13. It is, of course, normal practice to provide a contents gauge for each tank within clear sight of the refuelling operator and if the operator sees the tank is overfilling, he can switch off the refuelling pump manually. However as a precaution against failure of the human element as well as failure of the float switch, means are provided to relieve the pressure in the system and to switch off the pump automatically before a dangerous pressure can be built up. It will be understood that the aforementioned vent, while quite adequate to handle air escaping from the tank at a rate of 200 U. S. gals. per minute, would have to be excessively large and difficult to accommodate within the cramped structure of the aircraft in order to be capable of handling such a flow of fuel, and even if the vent were capable of handling such a flow, there would be a marked hydraulic shock upon the system when the rising fuel first covered the vent ports. Some installations embody simple pressure relief valves, discharging overboard, or alternatively a rupture plate is sometimes provided in each tank so that a sudden increase in pressure will blow out the plate and will not damage the permanent structure. However, in this invention the precautionary means are embodied in the selector unit itself, without the introduction of any additional parts. The strength of the springs 34 and 35 is so chosen that under normal refuelling conditions the said springs are just sufficient to hold their respective valves on their seatings: normally the springs are chosen to withstand a pressure of approximately 3 lb./sq. in. in the body of the unit and any increase above the pressure will lift the valves. Thus it will be seen that if, as in the example, fuel is flowing through the valve casing 23 into the branch 11 of the manifold and then experiences a sudden rise of pressure above the pressure to which the valves are set, the unselected valve 32 will be forced from its seating and act as a relief valve discharging into the tank 12. The pressure-sensitive switch 47 is so adjusted that simultaneously with the opening of the valve 32, the electrical circuit to the refuelling pump is broken.

Even if the tank 12 has been previously filled when the above described overfilling of the tank 13 occurs, there will be by statutory requirement, an air space over the fuel in the tank 12, which by the opening of the valve 32 will become available to absorb the excess fuel delivered before the refuelling pump is stopped, and furthermore the vent 12a of the tank 12 will be brought into play to assist the vent 13a of the tank 13 in handling the discharge of excess fuel. This latter point is of particular importance if, in addition to the failure of the float switch 45, the pressure-sensitive switch 47 fails to arrest the refuelling supply.

In effect, the valve 32 serves as a relief valve during the refuelling of the right hand side of the system, comprising the tank 13 and the branch 11 of the manifold, and similarly the valve 33 serves as a relief valve when the left hand side of the system is being refuelled. Thus each valve serves a dual purpose and operates alternately as an inlet valve and a relief valve. Furthermore, in its capacity of relief valve for one part of the system, it discharges into another part of the system, to wit that part of the system which it serves in the capacity of inlet valve, and thereby eliminates the inconvenience and fire risk associated with relief valves discharging large quantities of fuel overboard. Another advantage of this arrangement is that the valves are constantly in operation, serving their function as inlet valves, and therefore, when suddenly called upon to function as relief valves, there is little likelihood of their failure on account of freezing, corrosion or long periods of disuse.

Underwing refuelling systems in general have been criticized by reason of their weight in comparison to the old method in which fuel was supplied to the tanks under gravity. It has been shown, however, that a refuelling system in accordance with this invention is light in comparison with other types of underwing refuelling systems, firstly because the location of the selector unit aft of the rear spar and the ducting of the fuel into the tanks through the web of the rear spar requires an absolute minimum of reinforcement of the structure, since the structural members involved are relatively lightly stressed or have to accommodate relatively small holes, and secondly because, by use of the manifold system, each inlet valve can be arranged to function alternately as a relief valve without any additional parts, and such features as the pressure-sensitive switch 47 and the standard refuelling connector 17 are common to all tanks in the system. In some cases it may not be possible to arrange the vents on the individual tanks to be adequate to handle the refuelling flow even when all of them are brought into operation by the relief function of the selector unit and some designers may wish to provide in such circumstances a rupture plate as a final precaution against damage to the tank structure. In a system designed in accordance with this invention, even this rupture plate may be made common to all tanks in the system and the provision of one rupture plate in one tank or situated in the manifold will be sufficient to protect the whole installation.

The minimum number of tanks to one manifold is, of course, two if the benefits of the dual capacity selector unit are to be exploited, but there is no upper limit to the number of outlets which may be incorporated in one valve and correspondingly to the number of tanks which may be connected into one system. The choice, of course, must rest on a compromise, taking into consideration such points as the advantages of the manifold system, and the equipment and manpower which can conveniently and economically be brought to bear on the refuelling operation of the aircraft, so that rapid refuelling can be achieved with the minimum weight penalty. The form of the invention herewith shown and described is applicable to an aircraft having four tanks, two on the port side and two on the starboard, but it is to be understood that this is to be taken as a typical example and that various changes in the shape, size and arrangement of the parts may be resorted to, without departing from the spirit of my invention or the scope of the claims.

What I claim as my invention is:

1. In an aircraft, a system for the replenishment of fuel tanks comprising in combination fuel tanks, a selector unit and pressure-tight means for supplying fuel thereto from an external refuelling source, a manifold system connecting the said selector unit to at least two independent tanks in the aircraft, means in the selector unit such that fuel will be supplied only to the tank selected when the pressure of the fuel in the selector unit is below a given value and to at least one other tank connected thereto in the event of the pressure of the fuel in the selector unit rising above the said value.

2. In an aircraft, a system for the replenishment of fuel tanks comprising in combination fuel tanks, a selector unit embodying a pressure-tight disconnect socket for connection to an external refuelling source, a plurality of outlet valves from the selector unit, yieldable means for retaining each outlet valve in a closed position when the fuel in the selector unit is at a pressure not greater than a preselected pressure, but permitting opening of the valve when such preselected pressure is exceeded, the said means acting in opposition to the flow of fuel from the refuelling source, means for opening the said valves according to selection against the retaining means acting thereupon, conduit means connecting each of the said outlet valves to one of the fuel tanks, and vapor venting means in each tank of capacity sufficient to prevent a progressive increase of pressure in the tank during refuelling but insufficient to pass fuel pumped at said pressure without resulting in an increase of pressure in said tank.

3. In an aircraft, a system for the replenishment of fuel tanks comprising in combination fuel tanks, a selector unit embodying a pressure-tight disconnect socket for connection to an external refuelling source, a plurality of outlet valves from the selector unit, yieldable means for retaining each outlet valve in a closed position when the fuel in the selector unit is at a pressure not greater than a selected pressure, but permitting opening of the valve when such preselected pressure is exceeded, the said means acting in opposition to the flow of fuel from the refuelling source, means for opening the said valves according to selection against the retaining means acting thereupon, conduit means connecting each of the said outlet valves to one of the fuel tanks, vapor venting means in each tank of capacity sufficient to prevent a progressive increase of pressure in the tank during refuelling but insufficient to pass fuel pumped at such pressure without resulting in an increase of pressure in said tank, means in each tank for controlling the refuelling source such that the supply therefrom will be cut off when the fuel in any tank being replenished reaches a predetermined maximum level, and means within the system for controlling the refuelling source such that the supply therefrom will be cut off when the pressure in the said selector unit reaches a predetermined maximum value.

4. In an aircraft, a system for the replenishment of fuel tanks comprising in combination fuel tanks, a selector unit embodying a pressure-tight disconnect socket for connection to an external refuelling source, a plurality of outlet valves from the selector unit, yieldable means for retaining each outlet valve in a closed position when the fuel in the selector unit is at a pressure not greater than a preselected pressure, but permitting opening of the valve when such preselected pressure is exceeded, the said means acting in opposition to the flow of fuel from the refuelling source, means for opening the said valves according to selection against the retaining means acting thereupon, conduit means connecting each of the said outlet valves to one of the fuel tanks, vapor venting means in each tank of capacity sufficient to prevent a progressive increase of pressure in the tank during refuelling, means in each tank for controlling the refuelling source such that the supply therefrom will be cut off when the fuel in any tank being replenished reaches a predetermined maximum level, and means within the system for controlling the refuelling source such that the supply therefrom will be cut off when the pressure in the said selector unit reaches a value substantially equivalent to the pressure required to overcome the aforesaid valve retaining means.

5. In an aircraft wing having a main spar and a subsidiary spar, each running in a substantially spanwise direction, and an upper and lower skin together forming an aerofoil embracing the said spars, at least two fuel-containing cells situated between the said spars, means for replenishing the said cells comprising a selector unit connected by a manifold to the cells, the said selector unit being situated on the side of the subsidiary spar remote from the main spar, and each branch of the manifold entering a cell through a hole in the vertical web of the subsidiary spar, a pressure-tight disconnect socket whereby fuel from an external source may be supplied to the said selector unit, means of access to the disconnect socket from outside the aircraft, means for actuating the selector unit, and means within the unit whereby fuel will be supplied only to the cell selected when the pressure of the fuel in the selector unit is below a given value and to all the cells connected thereto in the event of the pressure of the fuel rising above the said value.

6. In an aircraft, a system for the replenishment of fuel tanks comprising in combination fuel tanks, a selector unit comprising a hollow body, an inlet, a pressure-tight disconnect socket in the inlet for connection to an external refuelling source, at least two outlets, a valve casing in each outlet, including a valve seat, a valve adapted to engage the valve seat to close the outlet, a spring normally pressing the valve into engagement with the seat in opposition to the flow of fuel from the refuelling source, but permitting the valve to disengage from the seat when pressure of the fuel exceeds a predetermined amount, means for selectively opening said valve against the spring pressure, and conduit means connecting each of said outlets to a different fuel tank, whereby when one of the valves is opened, fuel will flow into one of the tanks, but if the pressure of said fuel exceeds a predetermined amount at least one other valve will open against the pressure of its spring to permit flow of fuel into another tank.

KAZIMIERZ KSIESKI.

REFERENCES CITED

The following references are of record in the file of this patent:

UNITED STATES PATENTS

| Number | Name | Date |
|---|---|---|
| 2,376,022 | Wolcott | May 15, 1945 |

FOREIGN PATENTS

| Number | Country | Date |
|---|---|---|
| 355,849 | France | Sept. 15, 1905 |
| 611,167 | France | June 28, 1926 |